(12) United States Patent
Bosley et al.

(10) Patent No.: US 7,293,788 B1
(45) Date of Patent: Nov. 13, 2007

(54) STIRRUP AIDING A PERSON ENTERING OR EXITING A VEHICLE

(76) Inventors: Kenneth Randall Bosley, 634 Country Club Ave., NE., Fort Walton Beach, FL (US) 32547-1762; Bradley James Morrison, 1 Wimbledon Way, Shalimer, FL (US) 32579-1029

( * ) Notice: Subject to any disclaimer, the term of this patent is extended or adjusted under 35 U.S.C. 154(b) by 243 days.

(21) Appl. No.: 10/907,157

(22) Filed: Mar. 23, 2005

(51) Int. Cl.
*B60R 3/00* (2006.01)

(52) U.S. Cl. ............... 280/163; 280/164.1; 280/164.2; D12/203

(58) Field of Classification Search ............... 280/163, 280/164.1, 165, 166, 169; D12/202, 203; 182/90, 92
See application file for complete search history.

(56) References Cited

U.S. PATENT DOCUMENTS

| | | | |
|---|---|---|---|
| 642,215 A | 1/1900 | Erikson | |
| 1,439,210 A * | 12/1922 | Webster et al. | 362/495 |
| 2,021,522 A * | 11/1935 | Schacht | 428/41.7 |
| 2,084,014 A * | 6/1937 | Bronson | 280/169 |
| 2,975,858 A * | 3/1961 | Billingsley | 182/196 |
| 3,329,443 A | 7/1967 | Lowder et al. | |
| 3,758,134 A | 9/1973 | Stewart | 280/163 |
| 3,839,755 A | 10/1974 | Iannucci | 5/86 |
| 3,915,451 A | 10/1975 | Adams et al. | 272/57 E |
| 4,013,287 A | 3/1977 | Dickman | 272/136 |
| 4,243,218 A | 1/1981 | DeSousa | 272/114 |
| 4,370,373 A * | 1/1983 | Janicz | 428/151 |
| 4,544,991 A * | 10/1985 | Gorsuch | 362/495 |
| D296,887 S * | 7/1988 | Walling et al. | D12/203 |
| 4,785,910 A * | 11/1988 | Tonkovich | 182/92 |
| 4,947,961 A * | 8/1990 | Dudley | 182/92 |
| 4,995,477 A | 2/1991 | Perricone | 187/1 R |
| 5,125,704 A * | 6/1992 | Perechodnik | 293/115 |
| 5,347,797 A | 9/1994 | Seal et al. | 54/46.1 |
| 5,509,630 A | 4/1996 | Bringuier | 248/178.1 |
| D370,452 S * | 6/1996 | Beasley | D12/203 |
| 5,738,340 A | 4/1998 | Brantner | 254/337 |
| 6,082,752 A | 7/2000 | Sumrall | 280/163 |

(Continued)

FOREIGN PATENT DOCUMENTS

DE    197 12 969    10/1997

(Continued)

*Primary Examiner*—Christopher P. Ellis
*Assistant Examiner*—John D Walters
(74) *Attorney, Agent, or Firm*—Stephen Christopher Swift; Swift Law Office

(57) ABSTRACT

A stirrup attached to the rear of a vehicle, making it safer and easier to enter into and/or exit from the vehicle. It comprises a bottom member that is preferably flat and rectangular, vertical side members extending upwards from opposite edges of the bottom member, and a top member from which the side members depend. Optional features include a tread pad on the upper surface of the bottom member, a shin guard, an illumination light, and/or a brake light. In a first preferred embodiment, it is retained on the vehicle using an attachment member extending from the top member that is inserted into a trailer hitch. In a second preferred embodiment, it is retained on the underside of the vehicle's rear bumper using attachment members such as bolts. In a third preferred embodiment, it is welded to the underside of the vehicle's rear bumper.

15 Claims, 8 Drawing Sheets

U.S. PATENT DOCUMENTS

| | | | |
|---|---|---|---|
| D491,509 S * | 6/2004 | Bundy | D12/203 |
| 6,840,526 B2 * | 1/2005 | Anderson et al. | 280/166 |
| 6,857,680 B2 * | 2/2005 | Fielding | 296/62 |
| 6,926,265 B1 * | 8/2005 | Elliott | 267/140 |
| 2005/0247519 A1 * | 11/2005 | Reid | 182/92 |

FOREIGN PATENT DOCUMENTS

| | | |
|---|---|---|
| FR | 2 617 776 | 1/1989 |

* cited by examiner

STIRRUP AIDING A PERSON ENTERING OR EXITING A VEHICLE

BACKGROUND OF THE INVENTION

1. Field of the Invention

The present invention relates to stirrups aiding people entering or exiting a vehicle.

2. Description of the Prior Art

There are numerous prior inventions relating to stirrups and means for entering or exiting a vehicle, but none are equivalent to the present invention.

U.S. Pat. No. 642,215, issued on Jan. 30, 1900, to Eduard August Olef Erikson, discloses a step for mounting a vehicle.

U.S. Pat. No. 3,329,443, issued on Jul. 4, 1967, to Elmo Lowder and Cordie S. Oliver, discloses a swing-out step for mounting a vehicle.

U.S. Pat. No. 3,758,134, issued on Sep. 11, 1973, to George E. Stewart, discloses a breakaway step for high clearance vehicles.

U.S. Pat. No. 3,839,755, issued on Oct. 8, 1974, to Anthony Iannucci, discloses a mobile bed for the handicapped, with stirrups for supporting the feet of a handicapped person.

U.S. Pat. No. 3,915,451, issued on Oct. 28, 1975, to Robert C. Adams and Irma O. Adams, discloses a playground jumping device (or pogo stick) with stirrups for the feet of the user.

U.S. Pat. No. 4,013,287, issued on Mar. 22, 1977, to James J. Dickman, discloses a leg exercise and foot rest for automotive vehicles, in the form of a stirrup in the interior of an automobile.

U.S. Pat. No. 4,243,218, issued on Jan. 6, 1981, to Egas J. DeSousa, discloses a hopping vehicle (or pogo stick) with stirrups for the feet of the user.

U.S. Pat. No. 4,995,477, issued on Feb. 26, 1991, to Ann Perricone, discloses a safety device for elevators, with stirrups on ropes for passengers to use in an emergency.

U.S. Pat. No. 5,347,797, issued on Sep. 20, 1994, to Lesley T. Seal and Galen Seal, Jr., discloses a mounting stirrup for a horse, that allows a short rider to use one foot in the mounting stirrup to gain access to the regular stirrup with the other foot.

U.S. Pat. No. 5,509,630, issued on Apr. 23, 1996, to Jean-Marc Bringuier, discloses a motor vehicle for the shooting of a film in difficult and hilly ground, with stirrups for supporting the feet of a cameraman.

U.S. Pat. No. 5,738,340, issued on Apr. 14, 1998, to Charles U. Brantner, discloses a stirrup lifting device "for lifting a person onto an animal, large vehicle or other apparatus" (column 1, lines 48-50) with pulleys for raising the stirrups.

U.S. Pat. No. 6,082,752, issued on Jul. 4, 2000, to Randall M. Sumrall, discloses a step assembly, including a stirrup, for mounting to a wheel well of a vehicle to permit a user to step up on the side of the vehicle. The instant invention is distinguishable, in that it is attached in a different manner to the rear of the vehicle.

French Patent No. 2 617 776, published on Jan. 13, 1989, inventor Louis Marcel Brutsaert, discloses a clamping stirrup for fastening one or more objects to the wall of a vehicle.

German Patent No. 197 12 969, published on Oct. 30, 1997, inventors Axel Staats and Matthias Sandrock, discloses a child's car seat with a holding stirrup.

None of the above inventions and patents, taken either singly or in combination, is seen to describe the instant invention as claimed.

SUMMARY OF THE INVENTION

The present invention is a stirrup designed to be attached to the rear of a vehicle, to make it easier and safer for people to enter into and/or exit from the vehicle. It will be most useful in motor vehicles with a high ground clearance, such as a sports utility vehicle ("SUV"). It may be retained on the vehicle by using the vehicle's trailer hitch, or it may be bolted or welded to the underside of the vehicle's rear bumper.

Accordingly, it is a principal object of the invention to provide a means for making it easier to enter into and exit from a vehicle.

It is another object of the invention to provide a means for making it safer to enter into and exit from a vehicle.

It is a further object of the invention to provide an apparatus to assist in entering into and exiting from a high-ground-clearance vehicle.

Still another object of the invention is to provide an apparatus to assist in entering into and exiting from an SUV.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
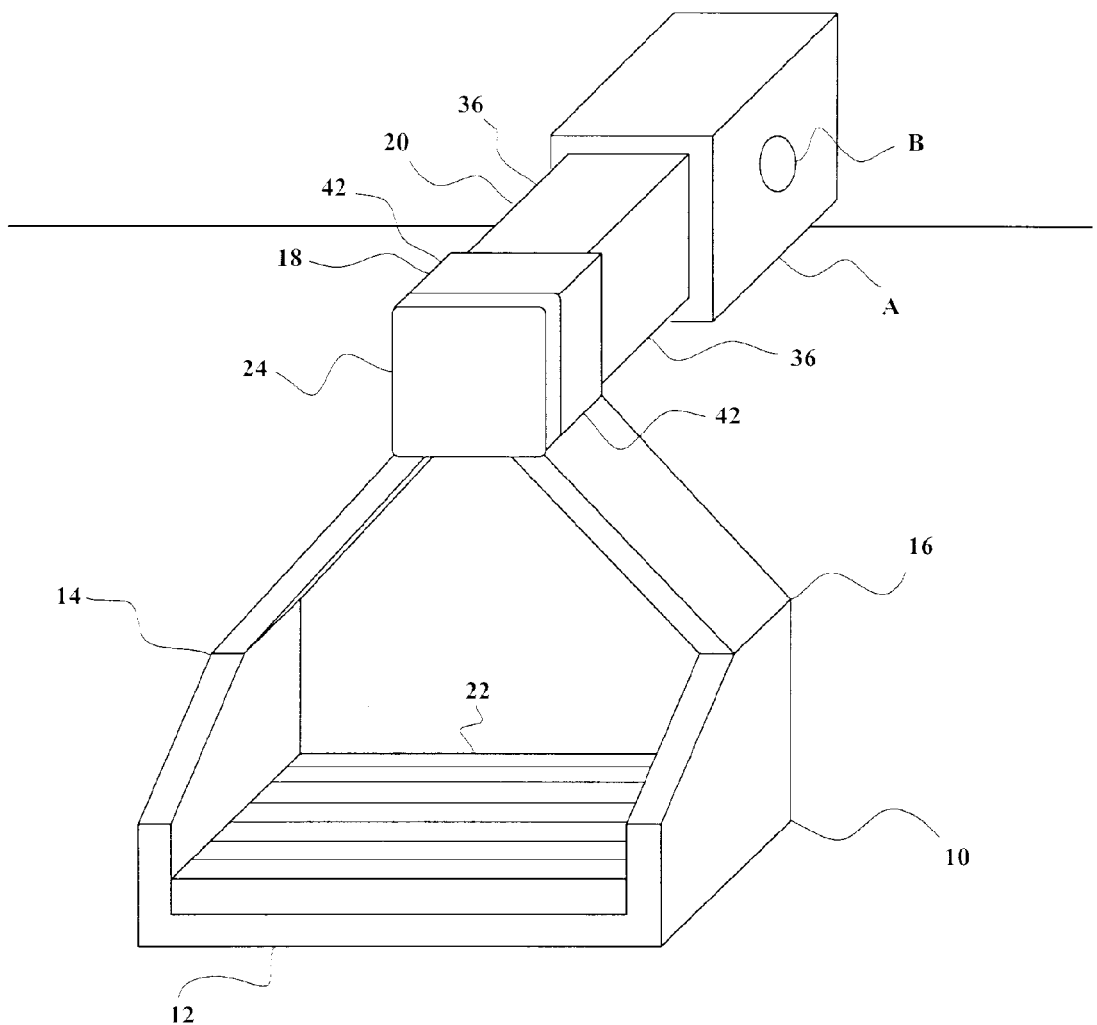
FIG. 1 is a perspective view of the first preferred embodiment of the invention.

The first preferred embodiment of the invention is illustrated in FIG. 1. The stirrup 10 comprises a bottom member 12, two side members 14 and 16 extending upwards from the bottom member, and a top member 18 from which the side members depend. The top, bottom and side members are preferably integrally joined in one piece. An attachment member 20 extends from the top member, and is removably retained in trailer hitch A using retention pin B. The bottom member is suitably dimensioned and configured to retain a person's foot, and is preferably flat and rectangular. Its upper surface may be covered by a tread pad 22, which is preferably made of rubber or a rubberized material. The tread pad preferably has lateral grooves, parallel to the front and back edges of the bottom member, to provide traction for shoes, boots, other footwear, or naked feet, thus preventing falls and injuries. There may be a shin guard 24 on the front of the top member. The shin guard is a pad that prevents bruises or other injuries to a person's shins if they step too far forward on the stirrup.

Figure 2:
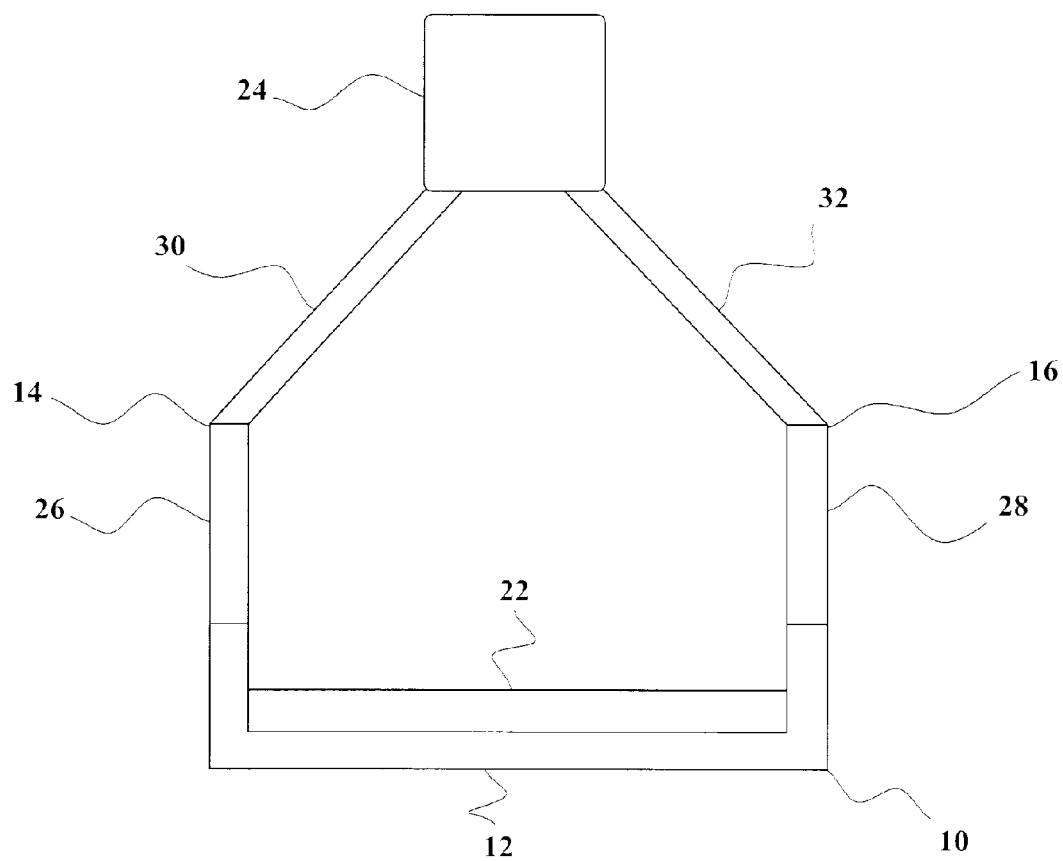
FIG. 2 is a front elevational view of the first preferred embodiment of the invention.

FIG. 2 is a front elevational view of the first preferred embodiment. It can be seen that the side members 14 and 16 have vertical lower portions 26 and 28 and inwardly sloping upper portions 30 and 32.

Figure 3:
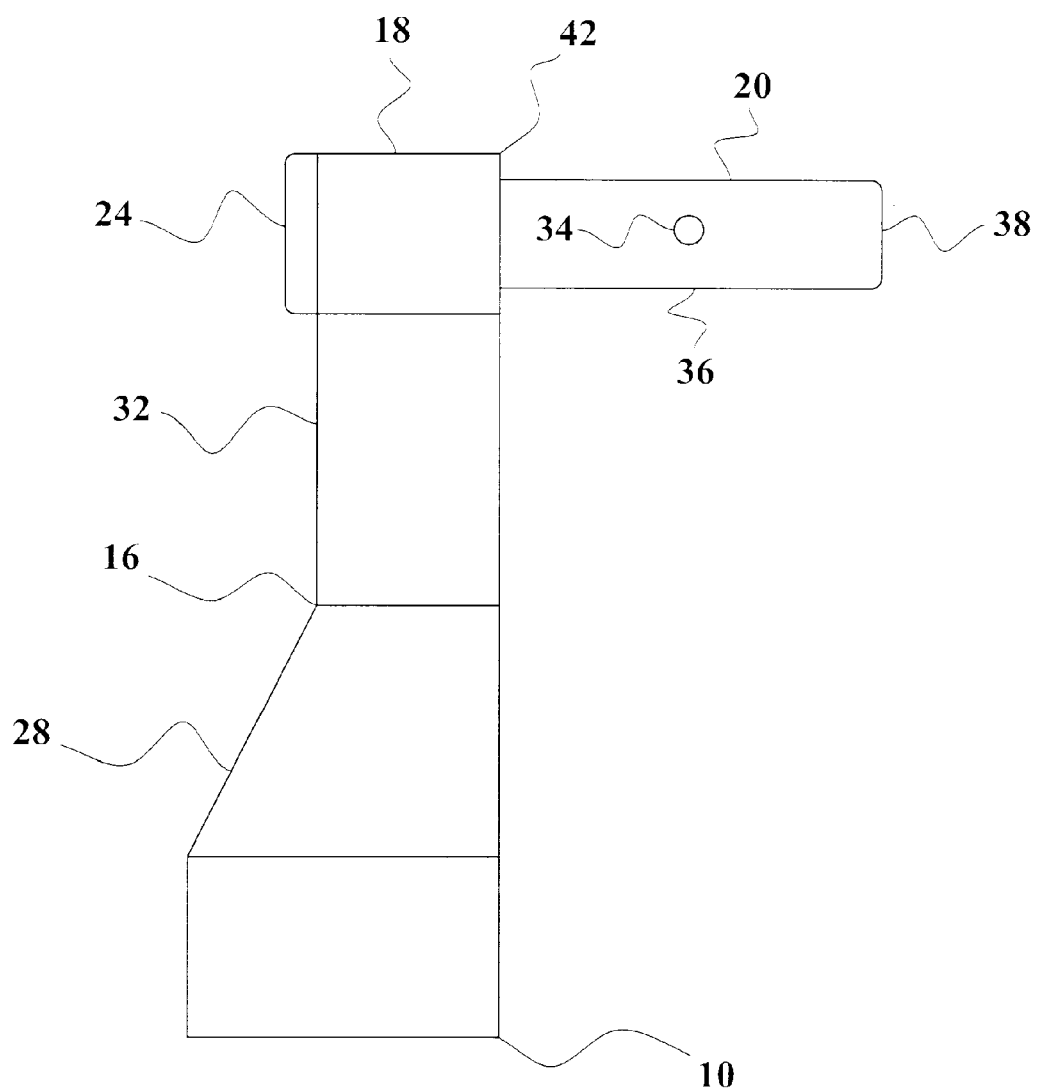
FIG. 3 is a right side elevational view of the first preferred embodiment of the invention.

FIG. 3 is a right side elevational view of the first preferred embodiment. Attachment member 20 preferably extends from the top member 18 at right angles to the side members 14 and 16. The attachment member has a first end (not shown in the drawings, as it is covered by the shin guard 24) retained within the top member and an opposite second end 38 extending from the top member. The attachment member has generally square first and second ends, and four generally rectangular sides 36 between the first and second ends, though the edges and corners between the sides and ends may be rounded. A cylindrical hole 34 passes between two opposite sides of the attachment member, and allows insertion of the retention pin.

Figure 4:
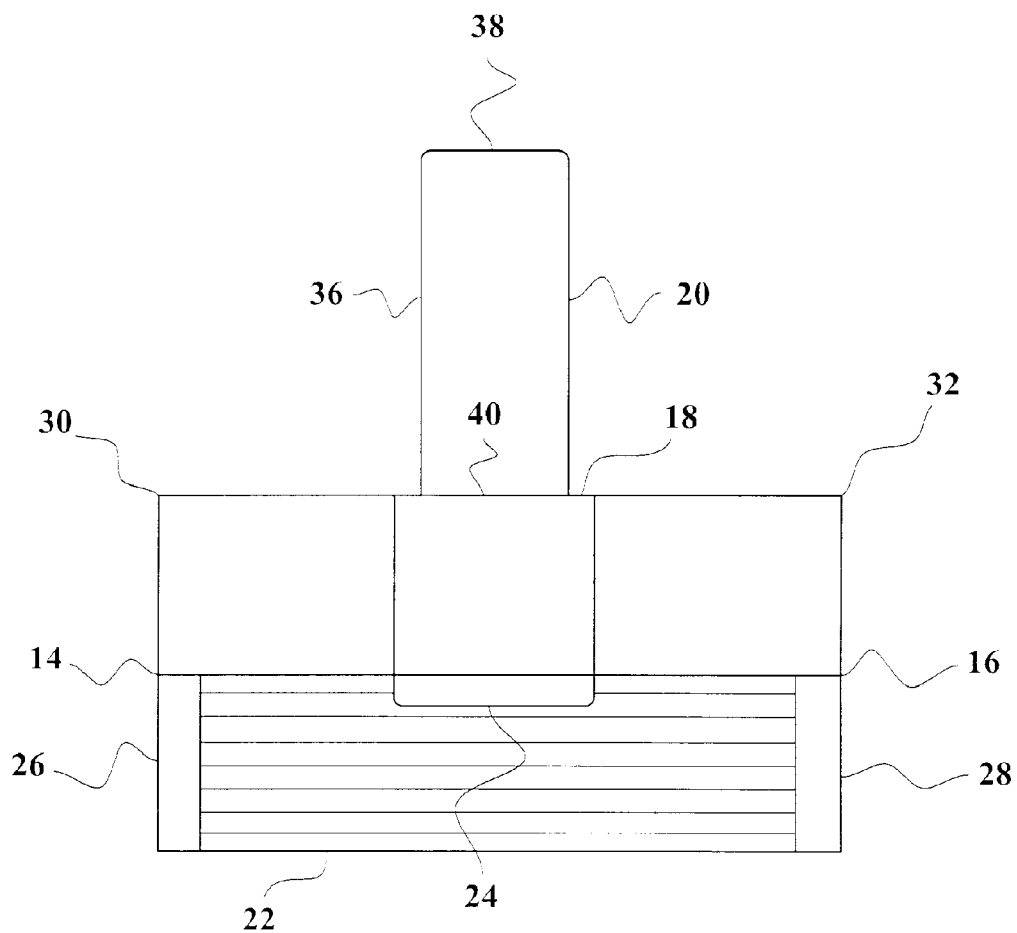
FIG. 4 is a top plan view of the first preferred embodiment of the invention.

FIG. 4 is a top plan view of the first preferred embodiment. The top member 18 preferably has a square horizontal top portion 40, and two square vertical side portions 42 (shown in FIGS. 1 and 3) joined to the tops of the upper portions of the side members.

The stirrup simultaneously limits both the foot's penetration (by the top member protected by the shin guard) and its lateral movement (by the side members). Thus, users are prevented from stepping too far under the vehicle's rear bumper, losing their balance and falling backward.

Figure 5:
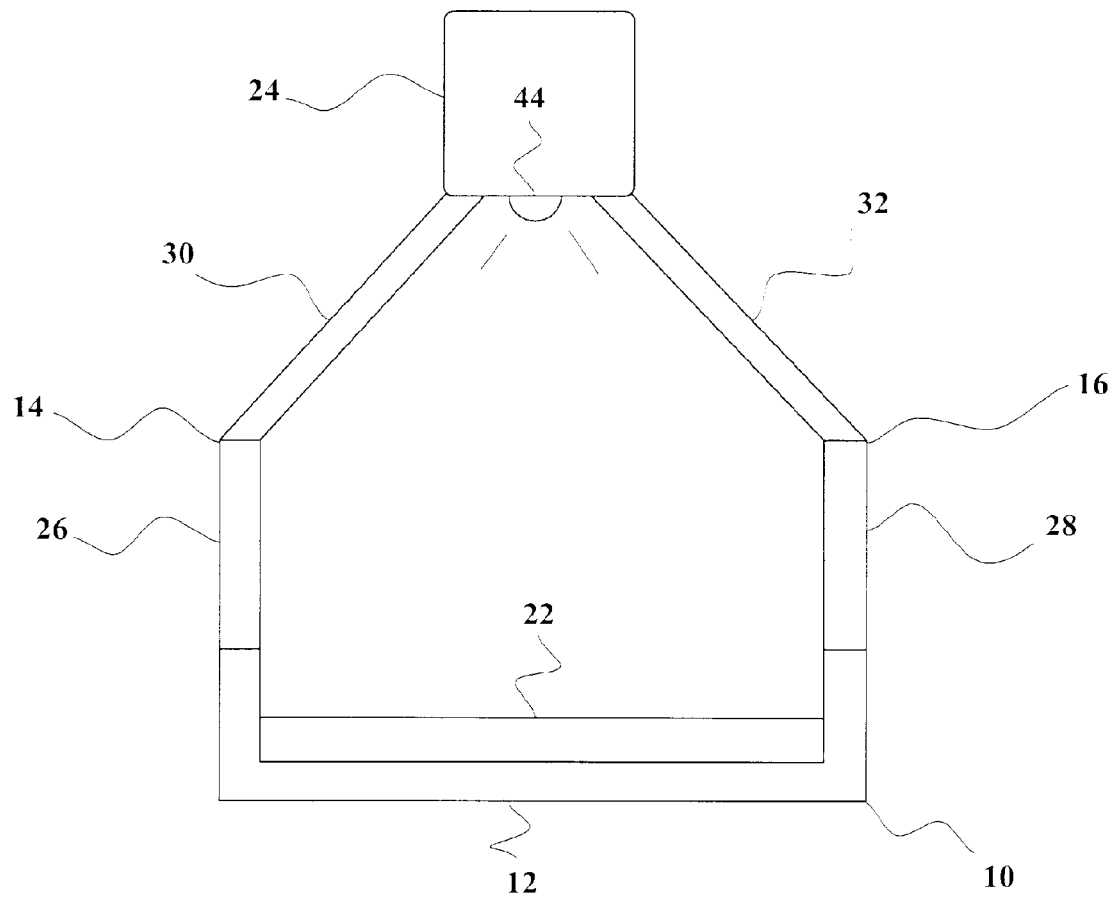
FIG. 5 is a front elevational view of the first preferred embodiment of the invention, showing the optional tread pad illumination light.

FIG. 5 is a front elevational view of the first preferred embodiment, showing the optional tread pad illumination light 44, which enables users to see the stirrup in the dark.

Figure 6:
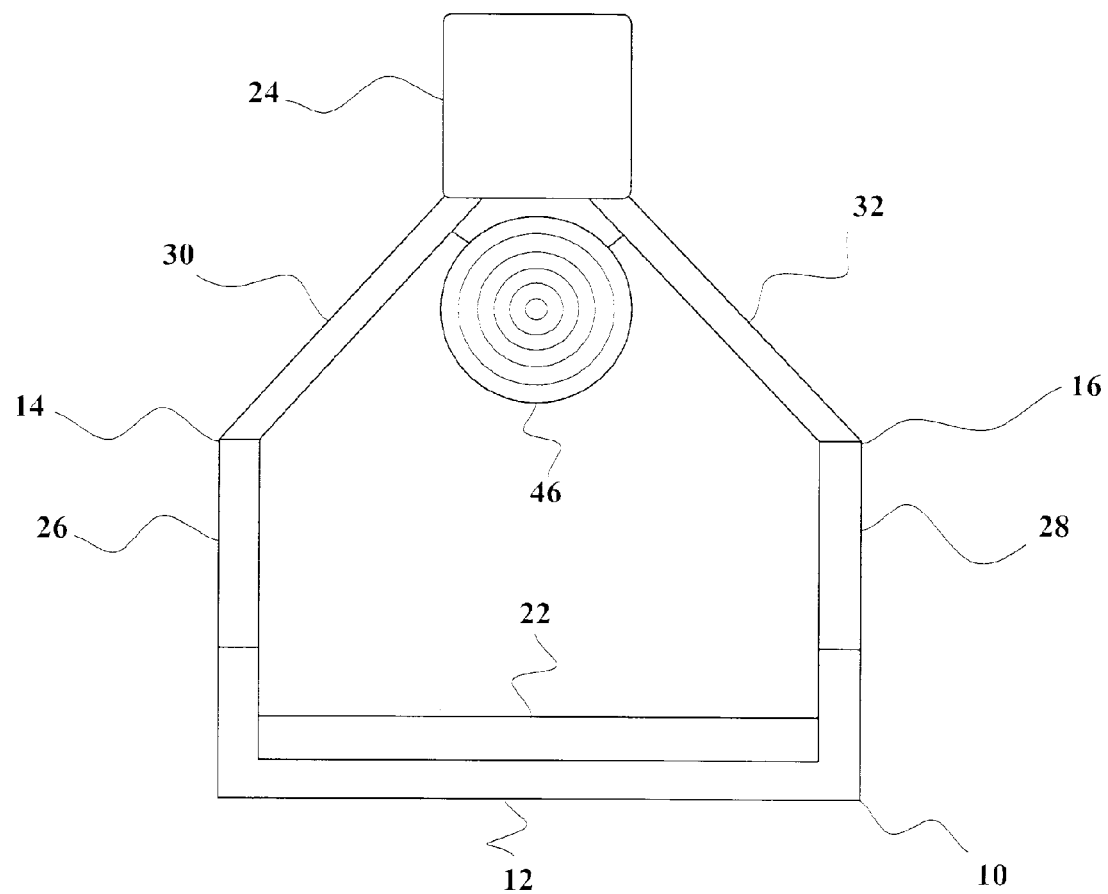
FIG. 6 is a front elevational view of the first preferred embodiment of the invention, showing the optional brake light.

FIG. 6 is a front elevational view of the first preferred embodiment of the invention, showing the optional brake light 46, which may be electrically connected to the vehicle's wiring system, so that it will light up when the brake pedal is pushed down.

Figure 7:
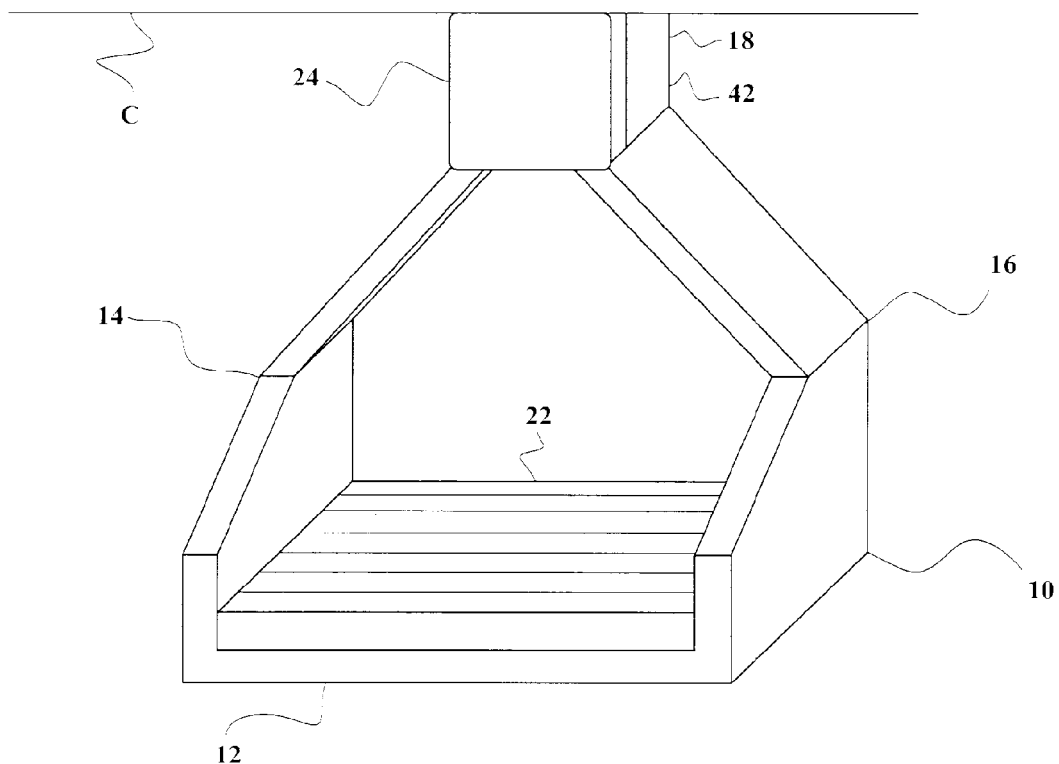
FIG. 7 is a perspective view of the second preferred embodiment of the invention.

FIG. 7 is a perspective view of the second preferred embodiment, which is the same as the first preferred embodiment, except that it is retained by removable attachment members (not shown in the drawings) on the underside of the vehicle's rear bumper C.

Figure 8:
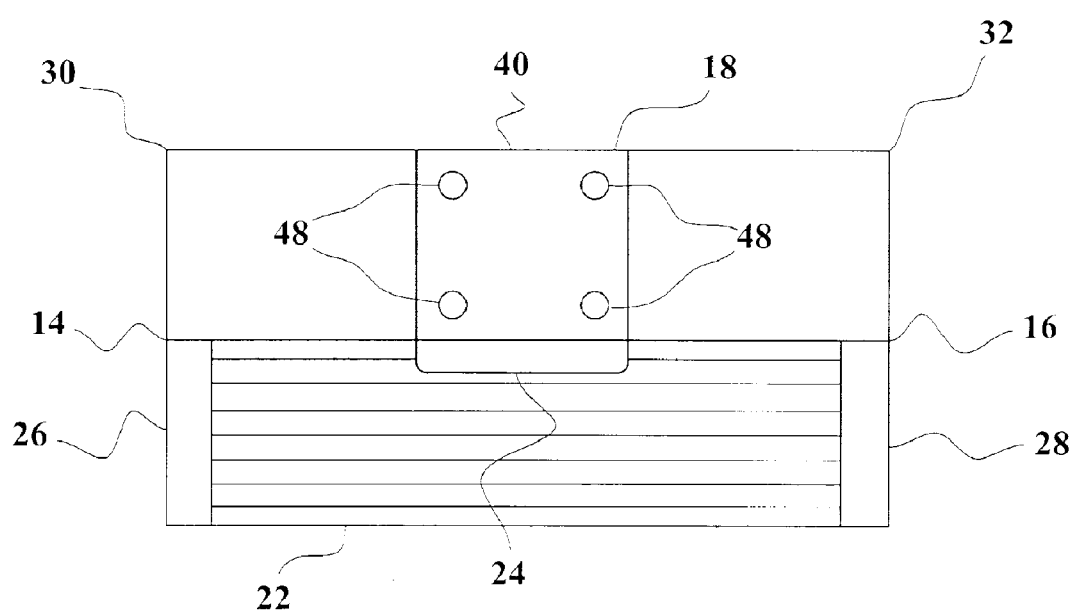
FIG. 8 is a top plan view of the second preferred embodiment of the invention.

FIG. 8 is a top plan view of the second preferred embodiment, showing the holes 48 in the top portion of the top member, through which the attachment members can be inserted. The attachment members are preferably bolts that are retained in threaded holes in the underside of the vehicle's rear bumper.

A third preferred embodiment is the same as the second preferred embodiment, except that it is welded to the underside of the vehicle's rear bumper. The third preferred embodiment will appear the same as shown in FIG. 7, but will not require the holes 48 in FIG. 8.

Preferably, the distance between the top and bottom members of the stirrup (or "drop") should be about half the distance between the floor or deck at the rear entrance of the vehicle and the ground, so that it provides a sturdy, secure intermediate step from the ground to the deck height. The stirrup can be manufactured with differing amounts of drop. Six inches of drop may be typical. Selection of the correct drop will provide users with more safe and easy ingress and egress from their vehicle without compromising the vehicle's ground clearance. The stirrup may be appropriately twisted or angled for differing trailer hitch receivers and bumpers.

It is to be understood that the present invention is not limited to the embodiments described above, but encompasses any and all embodiments within the scope of the following claims.

What is claimed is:

1. A stirrup aiding a person entering or exiting a vehicle, comprising:
   a bottom member, suitably dimensioned and configured to retain a person's foot;
   two side members, extending upwards from opposite edges of the bottom member;
   a top member connecting upper portions of the side members;
   an attachment member, having a first end retained within the top member and an opposite second end extending from the top member, suitably dimensioned and configured to be retained in a vehicle's trailer hitch; and
   a shin guard attached to the top member, wherein the shin guard and the top member are suitably dimensioned and configured to limit both the penetration of the user's foot into the stirrup, and to prevent injury to the user.

2. The stirrup aiding a person entering or exiting a vehicle according to claim 1, wherein:
   the bottom member is generally flat and generally rectangular;
   the side members have vertical lower portions and inward sloping upper portions;
   the top member has vertical side portions connected to the upper portions of the side members, and a horizontal top portion; and
   the attachment member has generally square first and second ends, four generally rectangular sides between its first and second ends, and an opening passing through two of the generally rectangular sides.

3. The stirrup aiding a person entering or exiting a vehicle according to claim 2, including a tread pad retained on an upper surface of the bottom member, said tread pad having grooves suitably dimensioned and configured to provide traction to feet and footwear.

4. The stirrup aiding a person entering or exiting a vehicle according to claim 3, including a light that can illuminate the tread pad.

5. The stirrup aiding a person entering or exiting a vehicle according to claim 3, including a brake light that can be electrically connected to a vehicle.

6. A stirrup aiding a person entering or exiting a vehicle, comprising:
   a bottom member, suitably dimensioned and configured to retain a person's foot;
   two side members, extending upwards from opposite edges of the bottom member;
   a top member connecting upper portions of the side members; and
   holes in the top member, suitably dimensioned and configured to enable attachment members to retain the top member on an underside of a vehicle's bumper; and
   a shin guard attached to the top member, wherein the shin guard and the top member are suitably dimensioned and configured to limit both the penetration of the user's foot into the stirrup, and to prevent injury to the user.

7. The stirrup aiding a person entering or exiting a vehicle according to claim 6, wherein:
   the bottom member is generally flat and generally rectangular;
   the side members have vertical lower portions and inward sloping upper portions;
   the top member has vertical side portions connected to the upper portions of the side members, and a horizontal top portion; and
   the attachment members are bolts that can be retained in threaded holes in the underside of the vehicle's bumper.

8. The stirrup aiding a person entering or exiting a vehicle according to claim 7, including a tread pad retained on an upper surface of the bottom member, said tread pad having grooves suitably dimensioned and configured to provide traction to footwear.

9. The stirrup aiding a person entering or exiting a vehicle according to claim 8, including a light that can illuminate the tread pad.

10. The stirrup aiding a person entering or exiting a vehicle according to claim 8, including a brake light that can be electrically connected to a vehicle.

11. A stirrup aiding a person entering or exiting a vehicle, comprising:
    a bottom member, suitably dimensioned and configured to retain a person's foot;
    two side members, extending upwards from opposite edges of the bottom member; and
    a top member connecting upper portions of the side members, said top member being welded to an underside of a vehicle's bumper; and
    a shin guard attached to the top member, wherein the shin guard and the top member are suitably dimensioned and configured to limit both the penetration of the user's foot into the stirrup, and to prevent injury to the user.

12. The stirrup aiding a person entering or exiting a vehicle according to claim 11, wherein:
    the bottom member is generally flat and generally rectangular;
    the side members have vertical lower portions and inward sloping upper portions; and
    the top member has vertical side portions connected to the upper portions of the side members, and a horizontal top portion that is welded to the underside of a vehicle's bumper.

13. The stirrup aiding a person entering or exiting a vehicle according to claim 12, including a tread pad retained on an upper surface of the bottom member, said tread pad having grooves suitably dimensioned and configured to provide traction to footwear.

14. The stirrup aiding a person entering or exiting a vehicle according to claim 13, including a light that can illuminate the tread pad.

15. The stirrup aiding a person entering or exiting a vehicle according to claim 13, including a brake light that can be electrically connected to a vehicle.

* * * * *